United States Patent [19]

Bolcavage et al.

[11] 4,335,460
[45] Jun. 15, 1982

[54] PRINTER SYSTEM HAVING PARITY CHECKING OF PRINT HAMMERS USING SOFTWARE CONTROL

[75] Inventors: Richard D. Bolcavage, Kirkwood; Armand J. Ferraro, Endicott, both of N.Y.; Arthur E. Fleek, Cary, N.C.

[73] Assignee: International Business Machines Corporation, Armonk, N.Y.

[21] Appl. No.: 115,841

[22] Filed: Jan. 28, 1980

[51] Int. Cl.³ .............................................. G06F 11/10
[52] U.S. Cl. ......................................... 371/49; 101/93
[58] Field of Search ................. 371/49, 25, 67; 101/93

[56] References Cited

U.S. PATENT DOCUMENTS

| | | | |
|---|---|---|---|
| 2,941,188 | 6/1960 | Flechtner et al. | 371/49 X |
| 3,066,601 | 12/1962 | Eden | 101/93 |
| 3,140,470 | 7/1964 | Deerfield | 371/67 |
| 3,222,651 | 12/1965 | Fabiszewski et al. | 371/67 X |
| 3,240,920 | 3/1966 | Barbagallo | 371/34 |
| 3,246,292 | 4/1966 | Woo | 371/67 |
| 3,474,956 | 10/1969 | Cain | 371/49 |
| 3,560,926 | 2/1971 | Mrkvicka | 371/67 |
| 4,008,389 | 2/1977 | Brunin et al. | 364/519 |

*Primary Examiner*—David H. Malzahn
*Attorney, Agent, or Firm*—John S. Gasper

[57] ABSTRACT

A printer control system for a belt printer has an arrangement for checking print hammer operating circuits by comparing a real time actual parity of the circuits with a precalculated expected parity. Prior to printing, a microprocessor calculates expected parity bytes for each subscan for storage in a storage device along with the print position fire data used for selecting the operating circuits to be activated in the related subscans. An actual parity byte is generated on a real time basis by ODD/EVEN parity circuits associated with groups of operating circuits for comparison with a composite parity byte generated each subscan by the microprocessor. The composite parity byte is generated by combining the expected parity bytes from the storage device for several successive subscans. The composite parity byte is updated each subscan by a process of subtracting the initial expected parity byte and adding a new subscan expected parity byte. Comparison is made when all the activating circuits are in stable condition.

16 Claims, 11 Drawing Figures

| | 1<br>ODD 1-47 | 2<br>ODD 49-95 | 3<br>ODD 96-131 | 4<br>EVEN 2-48 | 5<br>EVEN 50-96 | 6<br>EVEN 98-132 |
|---|---|---|---|---|---|---|
| X-ADDR | X0<br>2<br>4<br>6<br>8<br>10<br>12<br>14 | X0<br>2<br>4<br>6<br>8<br>10<br>12<br>14 | X0<br>2<br>4<br>6<br>8<br>10<br>12<br>14 | X1<br>3<br>5<br>7<br>9<br>11<br>13<br>15 | X1<br>3<br>5<br>7<br>9<br>11<br>13<br>15 | X1<br>3<br>5<br>7<br>9<br>11<br>13<br>15 |
| Y-ADDR | Y0<br>16<br>32 | Y48<br>64<br>80 | Y96<br>112<br>128 | Y0<br>16<br>32 | Y48<br>64<br>80 | Y96<br>112<br>128 |

EXAMPLES: PRINT POS. LATCH

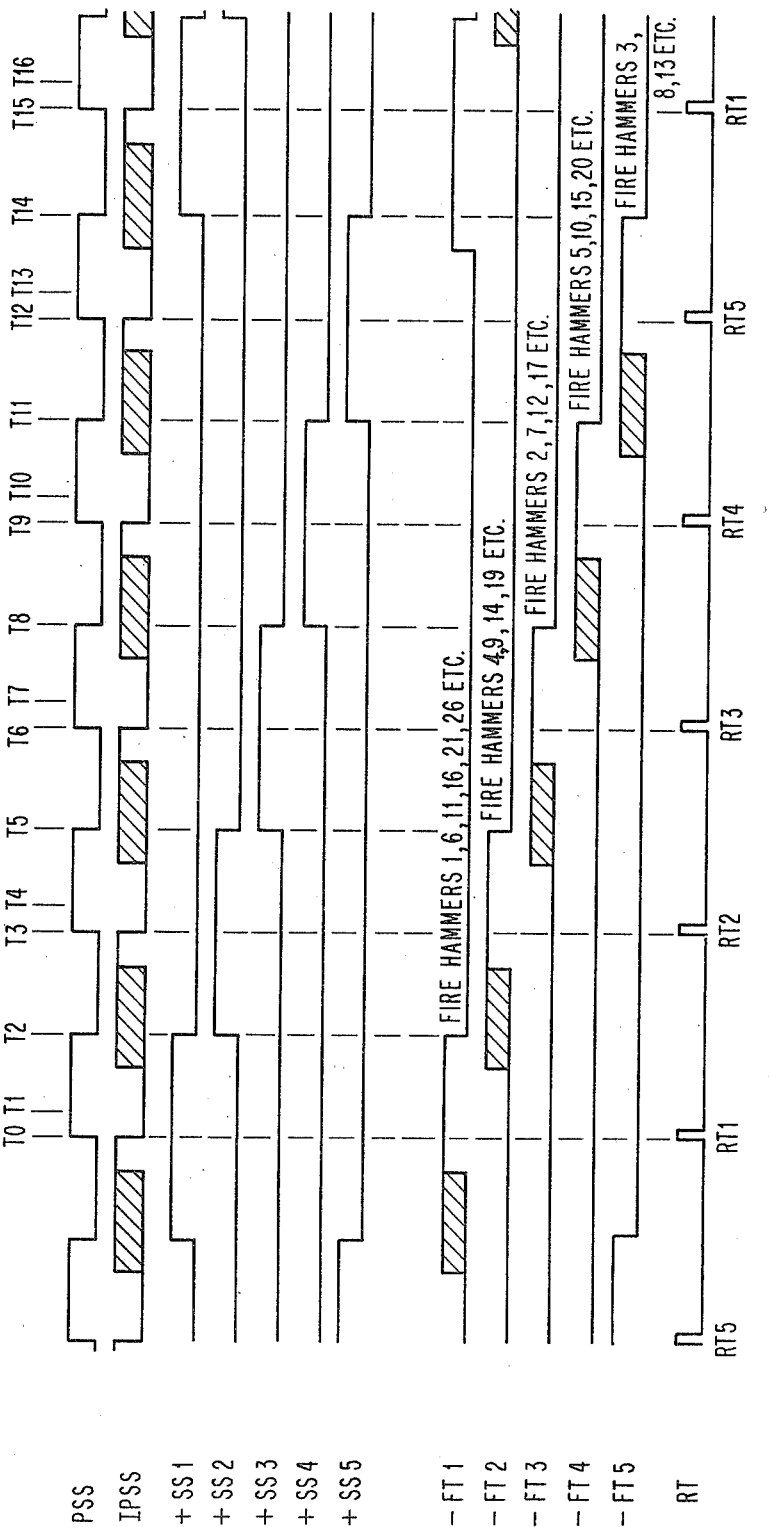

PRINTER SYSTEM HAVING PARITY CHECKING OF PRINT HAMMERS USING SOFTWARE CONTROL

DESCRIPTION

TECHNICAL FIELD

This invention relates to printer systems and particularly to controls for parity checking print hammers of high speed belt printers.

CROSS-REFERENCE TO RELATED APPLICATIONS

The following copending applications are cross-referenced and incorporated herein.
1. Application of R. D. Bolcavage, A. E. Fleek and M. P. Marcus entitled "Line Printer System and Method of Operation with Microprocessor Control" Ser. No. 115,855, filed Jan. 28, 1980
2. Application of R. D. Bolcavage, A. J. Ferraro and A. E. Fleek entitled "Belt Printer Control Architecture", Ser. No. 115,856, filed Jan. 28, 1980.

BACKGROUND ART

In high speed line printers print hammer checking arrangements commonly use feedback or echo signals from hammer operating circuits. These are compared one-on-one with activating or selection signals of the hammer operating signals. Since hammer selection and hammer firing occur in advance of the generation of the echo signals a certain amount of overlap is required to print at higher operating speeds. To permit overlap, the hammer selection and echo signals are first stored in separate memories and their contents compared for checking at a later time in the printing cycle. In some cases the generation of echo signals of a later subcycle overlaps the checking of the echo signals of a preceding subcycle. The following U.S. patents are representative of the prior art: Nos. 3,066,601, issued Dec. 4, 1962 to Harold E. Eden; 3,246,292, issued Apr. 12, 1966 to W. D. Woo; 3,140,470, issued July 7, 1964 to A. J. Deerfield; 3,222,651, issued Dec. 7, 1965 to E. S. Fabiszewski, et al; 3,560,926, issued Feb. 2, 1971 to J. Mrkvicka; 3,240,920, issued Mar. 15, 1966 to C. J. Barbagallo, et al.

U.S. Pat. No. 3,474,956, issued Oct. 28, 1969 to P. A. Cain describes a punch machine or drum printer which uses parity checking. A punch selection parity signal generated concurrently with the punch electromagnet selection is stored in a time delay circuit for later comparison with a timed punch operation parity signal occurring later in the operating cycle. The use of memory in timing of punch cycle operations allows punch selection to overlap the parity checking, each punching operation being checked separately.

U.S. Pat. No. 4,008,389, issued Feb. 15, 1977 to J. Brunin, et al, describes a print hammer error checking arrangement for a belt printer in which characters and hammers are aligned in subcycles or subscans. Error detectors are combined with the hammer amplifier circuits which operate the print hammers. In the event the selected amplifier circuit fails to operate, an error signal is generated which is gated through an error detection matrix to an error register which records the number of the column and the number of the subcycle in which the error occurred. Flipflops are set when an error is gated through the matrix and are then checked at the end of printing a line.

In general, the prior art arrangements whether using one-for-one or parity checking has involved relatively complex memory, memory control and other circuitry that require excessive processing time. Such arrangements when adapted to belt printers operating on the subscan principle become even more complex which increases cost and unnecessarily limits the printing rates of the printer mechanism.

SUMMARY OF THE INVENTION

In accordance with this invention a subscan operating belt printer system has control means which checks the operating circuits for the hammers of the printer using an actual parity and a precomputed parity. Actual parity is generated real time by parity circuits associated with the operating circuits. Computed parity is a composite parity derived each subscan by the control system from the combination of the expected parity for one or more previous subscans. The expected parity for each subscan is generated by the control system in advance of printing and is stored for subsequent retrieval and use for computing and updating the composite parity each subscan. Expected parity is preferably part of the subscan ordered fire tables of a storage means which includes print position fire data used for selecting the operating circuits to be actuated during the related subscans and is preferably generated and stored in the course of building the subscan fire tables. The composite parity is updated each subscan by subtracting the initial expected parity of the group of subscans and adding the expected parity of a subsequent subscan and so on until the last subscan in the printing cycle is completed.

In the preferred embodiment the operating and associated parity circuits are arranged in a plurality of groups. The parity circuits generate ODD/EVEN parity signals for each group. Actual parity comprises the combination of the ODD/EVEN parity signals of the group to form an actual parity byte. Each group of circuits is identified by a number and may be packaged as a field replaceable unit. The control system further includes a table containing the group numbers related to print positions for the operating circuits. Expected parity for each subscan is generated by a process of exclusive ORing the group numbers from the table for the related print positions in the fire tables.

The invention is preferably practiced in a control system using a microprocessor for controlling all the described checking selection and activating functions which include generating the expected parity, computing and updating the composite parity, and comparing the composite parity with the actual parity. Microprocessors operate at relatively high speeds and can be easily programmed to perform the various checking and control operations for operating belt printers at sustained high operating speeds.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 4 is a table for explaining the decoding scheme used by the hammer position decode of FIG. 3.

FIG. 7 is a timing chart showing the signals for operating the various elements of the control system and the print hammer elements.

FIG. 1 shows a printer system which controls the printing operations of a belt type printer mechanism. As described more fully in the cross-referenced application number 2 of R. D. Bolcavage, et al, the printer mechanism includes a row of print hammers and a revolving type belt or similar linear type carrier by which characters are movable continuously past the print hammers. Because of differences in the pitch of the print hammers and the characters, printing occurs on the basis of scans and subscans in which various groups of characters are aligned/optioned to various groups of hammers which are selectively operated to record characters on a print medium. The subscan alignment sequences are repetitive throughout the printing cycle which could include one or more lines of data printed in succession at high printing rates.

Figure 1:
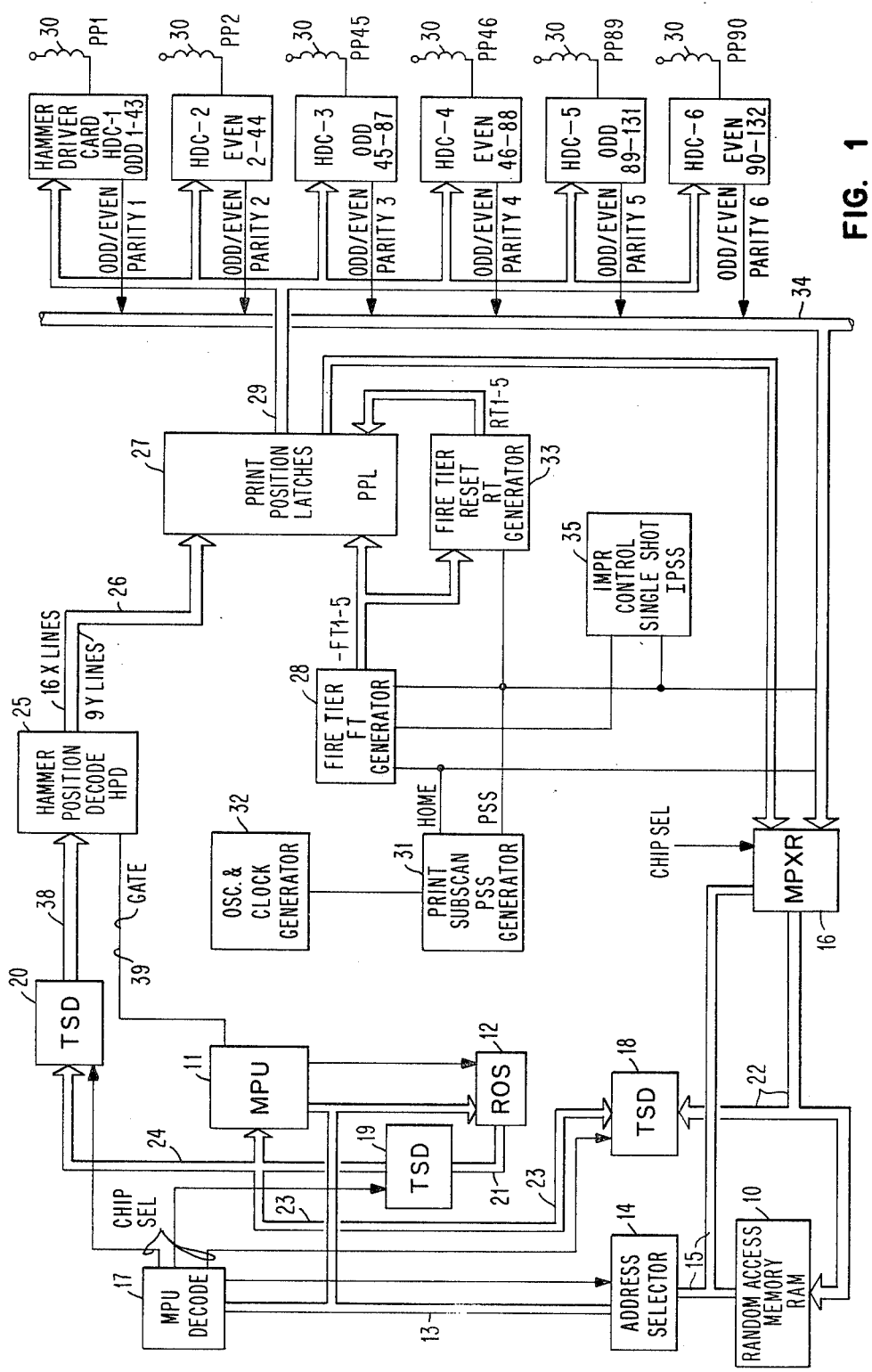
FIG. 1 is a schematic diagram of a printer control system for practicing the invention.

Also, as described in more detail in the above mentioned cross-referenced application, lines of data stored in a random access memory RAM 10 are rearranged therein into a printing algorithm by a microprocessing unit MPU 11 in accordance with suitable microprogramming contained in a read-only storage ROS 12. The printing algorithm includes various tables including a subscan table SST and a print position fire table PPFT the latter of which contains the print position fire data organized in subscan order to be used by MPU 11 for controlling the operation of the print hammers optioned with characters in the subscan sequences. In accordance with this invention, expected parity is also stored in the PPFT with the subscan fire data. More particularly, MPU 11 calculates the expected parity during the building of the print position fire table. Specifically, each print position added to the print position fire table in a subscan results in MPU 11 calculating and recalculating the expected parity for that subscan and storing it in the storage location following the last position in the print position fire table.

Address connections for MPU 11 to ROS 12 and RAM 10 comprise Address Bus 13, Address Selector 14 and Address Bus 15. Address Bus 15 also connects Address Selector 14 to a multiplexor MPXR 16. Address Bus 13 is further connected to MPU decode 17 which generates various gating CHIP SEL signals to Tri-State devices TSD 18, 19 and 20 as well as to MPXR 16. Data used by MPU 11 for building the printing algorithm tables and for controlling print hammer operation as well as for parity calculation and checking flows from ROS 12 on Data Bus 21 through TSD 19 and from RAM 10 and MPXR 16 on Data Bus 22 through TSD 18 and bus 23 to MPU 11 and on Data Bus 24 to TSD 20 from MPU 11. The operation of MPU 11 which corresponds with MPU 2 in the abovementioned cross-referenced application is more fully described therein.

To print a line of data, MPU 11 addresses the subscan locations in the subscan table in RAM 10 which contain an indirect address pointing to an address in the PPFT where a print position count followed by one or more bytes of fire data for the print positions corresponding to the print hammers to be fired as well as the expected parity for that corresponding subscan. The fire data which in the preferred embodiment is an 8-bit byte per print position is sent by MPU 11 on bus 24 through TSD 20 to the input of a hammer position decode HPD 25. HPD 25 converts the 8-bit print position fire data into a 16X and 9Y code which is sent by a gating pulse on line 39 from MPU 11 onto bus 26 to the print position latches PPL 27. Individual latches in PPL 27 when set by an X and Y address signal on bus 26 gate fire tier pulses—FT1-5 from fire tier generator 28 over the lines of bus 29 and into the branches to various selected hammer operating circuits on hammer driver cards HDC 1-6 which energize coils 30 designed for operating individual print hammers as designated by the print position fire data taken from RAM 10. Print subscan PSS generator 31 driven by oscillator & clock generator 32 and timing marks on the type belt provides print subscan PSS pulses to the fire tier generator 28 to produce fire tier pulses—FT1-5 and to fire tier reset RT generator 33 which applies reset pulses RT1-5 to PPL 27 (see FIG. 7). PSS pulses are also supplied to MPU 11 for timing the printing and other operations as described in the above-mentioned application number 2 of Bolcavage, et al.

Each hammer driver card HDC 1-6 contains twenty-two hammer operating circuits designated ODD or EVEN for energizing, when selected, a corresponding number of odd or even numbered hammer operating coils 30. For example: HDC-1 contains twenty-two driver circuits for the coils 30 connected to hammers at the odd-numbered print positions 1-43. HDC-2 contains a like number of driver circuits for coils 30 of the even-numbered print positions 2-44, and so on, as shown in FIG. 1. The HDC's contain parity circuits associated with the hammer operating circuits and are designed to supply the six ODD/EVEN PARITY 1-6 signals on the feedback connections shown in FIG. 1 to MPXR 16 via bus 34. Each card contains a parity return signal indicating whether the real time actuated driver circuits contain an EVEN or ODD count. The six ODD-/EVEN PARITY 1-6 signals are constantly present on the bus 34 and constitute an actual parity AP byte to be gated through MPXR 16 and TSD 18 by MPU 11 for the purposes of performing the checking of the hammer operating circuits in the manner to be described hereinafter.

Basic Timing

Before proceeding with further description of the printer control system the basic timing is described.

In FIG. 7 the PSS pulses from the PSS generator 31 provide the basic timing for the fire tier FT generator 28 and fire tier reset RT generator 33 and for MPU 11 as previously mentioned. Subscan intervals are designated +SS1-5 and correspond in length to a PSS cycle beginning with the trailing edge of the PSS pulses.

The fire tier pulses are designated—FT1-5. The numbers associated with the—FT1-5 pulses indicate the hammer positions optioned during the related fire tier time interval. Fire tier pulses measure the length of time hammer operating circuits are energized, for hammers selected in the preceding subscan. For example: when—FT1 is turned on at T 2 by the trailing edge of a PSS pulse for the hammers selected during +SS1, turn on occurs at the end of +SS1 and the beginning of +SS2, and so on. Fire tier pulses—FT 1-5 are timed out by the FT generator 28 between three and one-half to four and one-half subscans later, actual hammer impacting occurring near the end of that interval. FT generator 28 performs the time out by counting the prescribed number of leading edges of the PSS pulses beginning with the first leading edge after the fire tier pulse is turned on. The actual on time of the fire tier pulses is a variable and is designed to be adjustable by setting of an impression control single shot IPSS 35 in accordance with the number of layers of the print medium. The cross-hatching in the IPSS signal and the—FT 1-5 signals represent the range of adjustment. Parity checking always occurs outside this range. Fire tier reset signals RT 1-5 are very short duration pulses, for example in the neighborhood of three microseconds, initiated by the leading edge of PSS pulses and serve to reset the print position latches selected by HPD 25 for the corresponding fire tier. For example: RT 5 resets print position latches in PPL 27 after—FT 5 has gone OFF. Each reset pulse +RT 15 is repeated by the RT generator 33 every fifth subscan.

Other components of the printer control system of FIG. 1 are described as follows:

Hammer Position Decode

Figure 2:
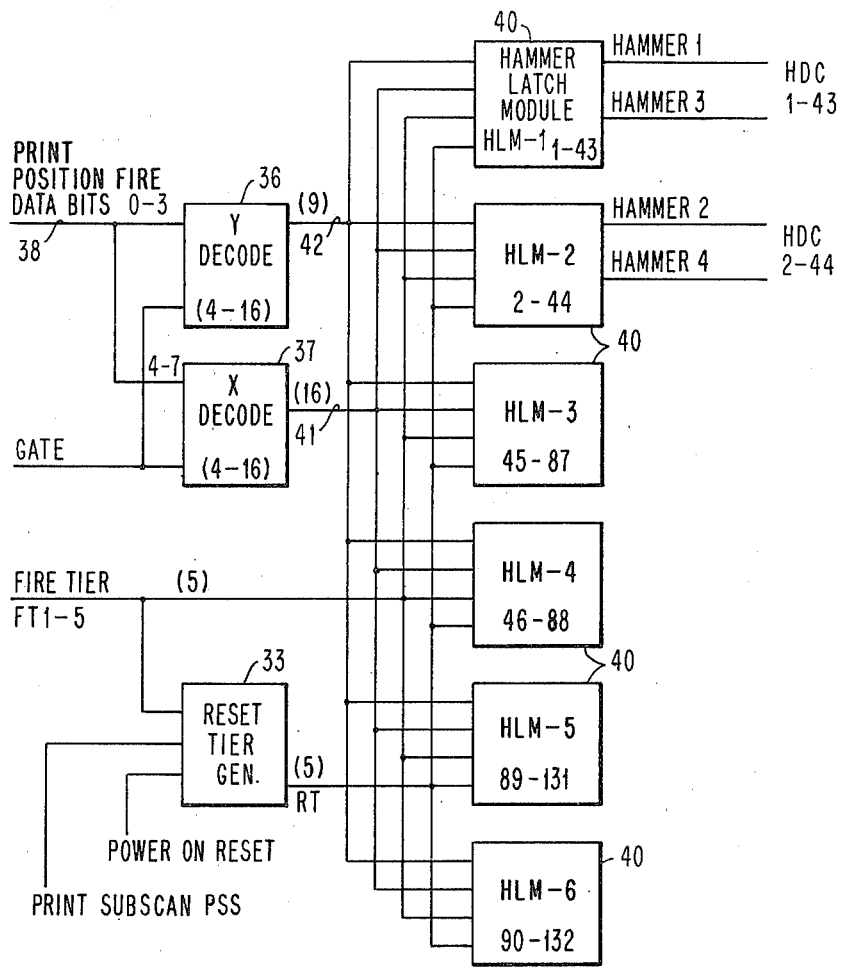
FIG. 2 is a schematic diagram showing the hammer position decode and print position latches with the reset tier generator portion of FIG. 1.
Figure 3:
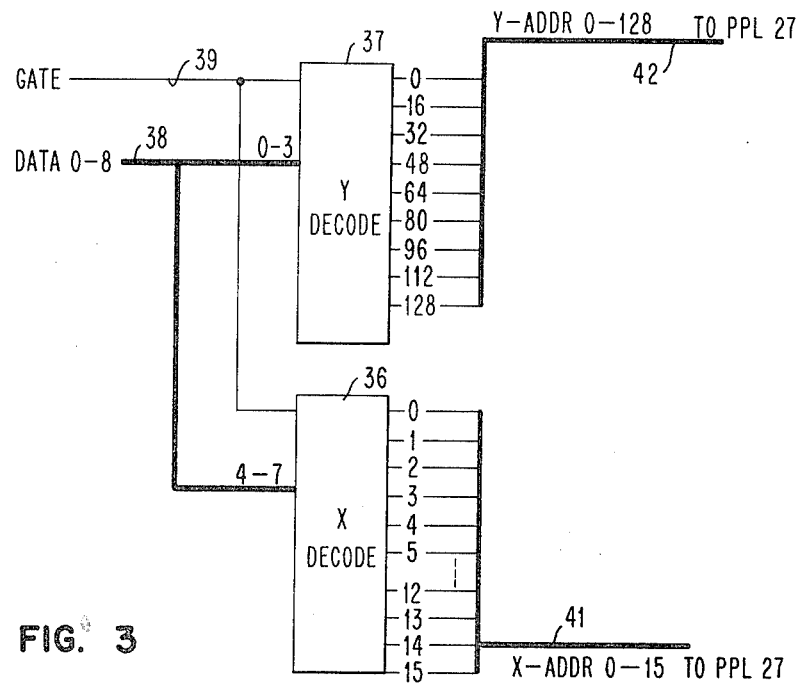
FIG. 3 is a schematic of the hammer position decode portion of FIG. 1.

As shown in FIGS. 2 & 3 the hammer position decode HPD 25 comprises X and Y decode circuits 36 and 37 which are conventional 4 to 16 bit decoders. Four data bits (4-7) from the 8-bit print position fire data byte on bus 38 from TSD 20 are decoded by the X decode 36 for bringing up one of 16X address lines 41 which are part of bus 26 in FIG. 1. The X address lines 41 are designated by the successive numbers 0-15. Four bits (0-3) of the print position data byte on bus 38 are decoded by a Y decode 37 for activating one of 9 (out of a possible of 16) Y address lines 42 of bus 26 in FIG. 1. The Y address lines 42 are designated in succession by the numbers 0-128. A GATE signal on line 39 from MPU 11 sends the selection pulses on the decoded X and Y address lines 41 and 42 connected to print position modules 40 via busses 42 and 41 of bus 26.

Latches in PPL 27 are selected by combination of decoded signals on lines 41 & 42. The specific combination for connecting and selecting a particular latch on the modules 40 is determined from the latch selection chart of FIG. 4. As shown in the examples indicated, the position latch PPL 1 which is in the odd column 1 has the address combination X0 and Y0 while PPL 2 in even column 4 has address combination X1 and Y0. Other combinations can be determined for 132 latches (corresponding with 132 hammer operating circuits and print hammers) from the chart and examples shown.

Print Position Latches PPL 27

PPL 27 for the illustrated embodiment comprises 132 latches arranged in suitable configuration, each latch being connected to the combination of an X and Y address line from bus 26 as described and plus further connections to the FT generator 28 and RT generator 33. FIG. 2 shows the circuit configuration in which print position latches are grouped in modules 40 designated HLM 1-6 in an ODD/EVEN arrangement corresponding with the ODD/EVEN arrangement of the hammer driver cards HDC 1-6. Lines 41 and 42 comprise the sixteen (16) and nine (9) X and Y address lines of bus 26 as previously described.

Figure 6:
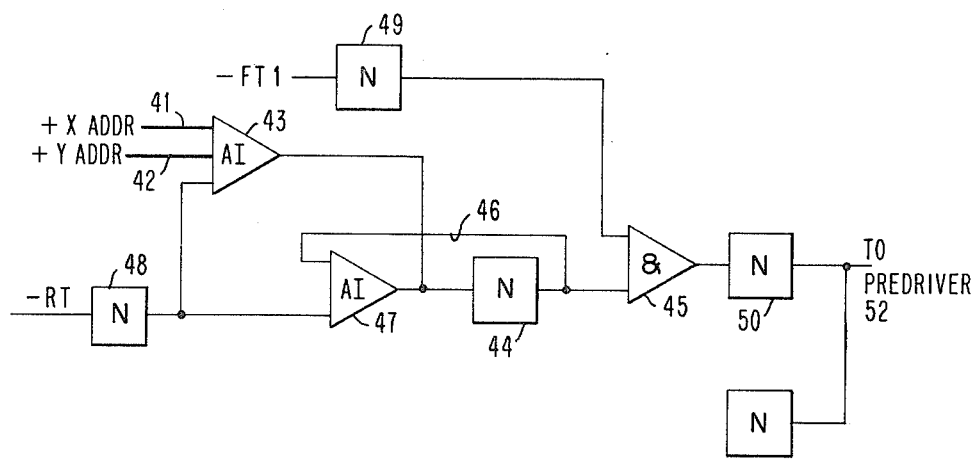
FIG. 6 is a detail circuit of one of the print position latches of FIG. 1.
Figure 5:
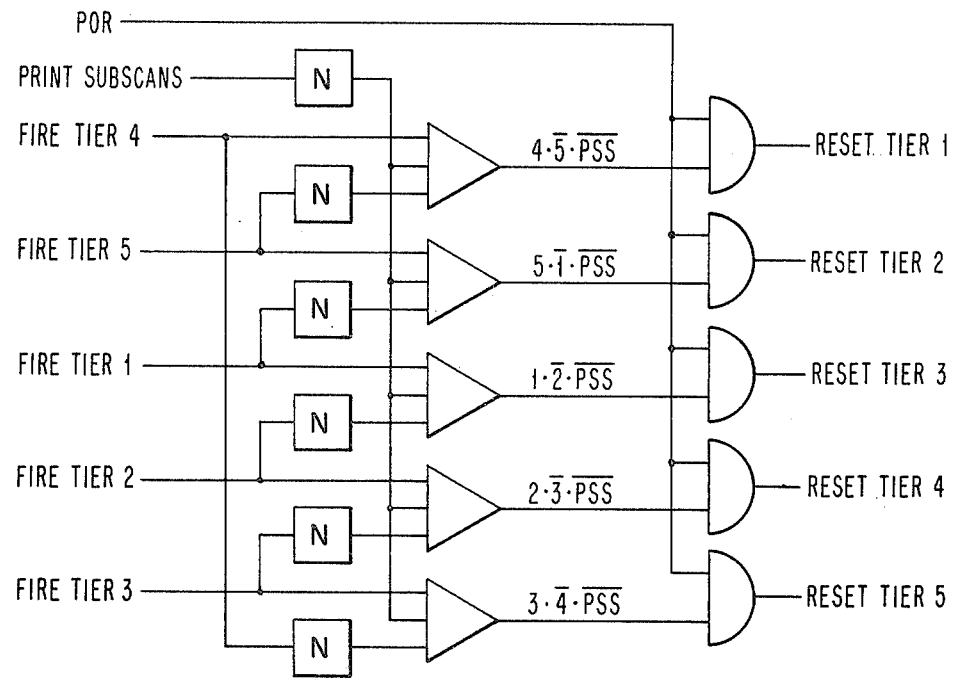
FIG. 5 is a detail logic circuit diagram of the reset tier generator portion of FIG. 2.

In the detailed schematic of FIG. 6 selection signals for the X and Y address on lines 41 and 42 to AND INVERT circuit AI 43 during RT time causes a gating signal to be applied through inverter 44 to AND circuit 45. The gating signal is supplied also on the feedback connection 46 to the input of AND INVERT circuit AI 47. This sets the latch and holds the gating signal at AND gate 45 until reset by an RT signal through inverter 48 to AI circuits 43 and 47. Fire tier signals—FT 1-5 through inverter 49 are GATED through AND circuit 45 and inverter 50 to the input of a predriver circuit which is part of the hammer operating circuits of HDC 1-6. For example: for print position PP 89 to be selected, as illustrated in FIG. 4 the signals on lines 41 and 42 to AI circuit 43 would be X 8 from X decoder 36 and Y 80 from Y decoder 37. This combination sets the latch for gating the fire tier signal—FT 2 through AND gate 45 and inverter 50 to the predriver circuit for print position 89 on the hammer driver card HDC −5.

Figure 10:
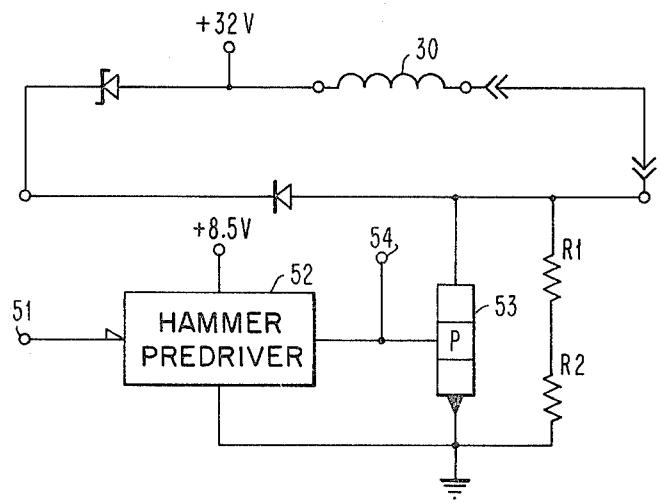
FIG. 10 shows circuitry for operating the hammer driver coils of FIG. 1.

Hammer operating circuit FIG. 10 is a schematic showing a hammer operating circuit usable for energizing one of the coils 30 of an individual print hammer. The input 51 of hammer predriver 52 is connected to inverter 50 of FIG. 6 for activation as previously described. The output of predriver 52 is connected to the base of transistor 53 of a driver circuit which includes resistors R 1 and R 2. When turned by a fire tier signal to predriver 52, transistor 53 draws current from the +32 V power supply through hammer coil 30 to ground. Terminal 54 is a connection point for the feedback to the parity circuits.

Parity Circuits

Figure 8:
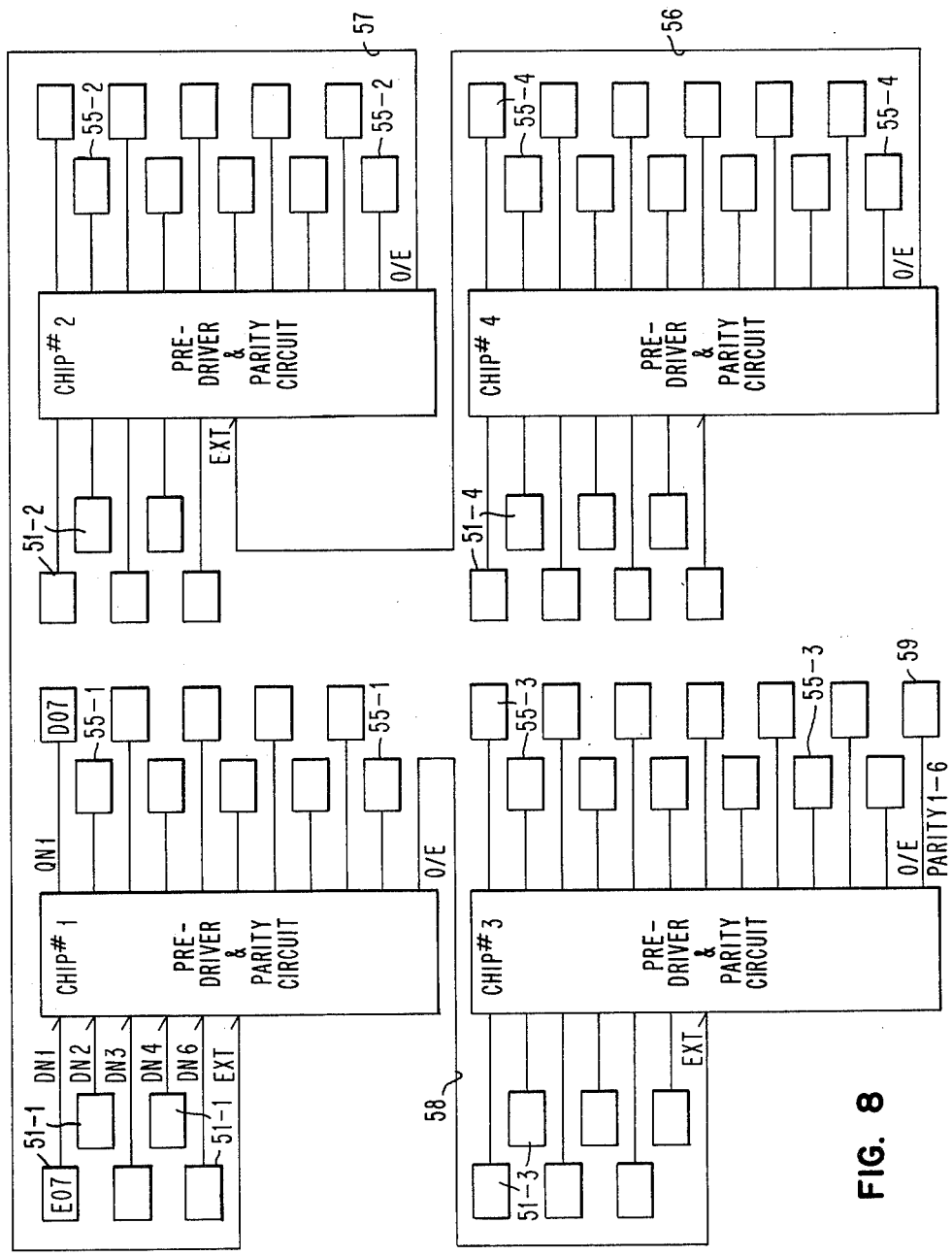
FIG. 8 is a detail circuit diagram showing the configuration of modules containing the predriver and parity circuit for one of the hammer driver cards of FIG. 1.

The circuit diagram of FIG. 8 consists of four circuit modules Chips #1-4 which contain predriver and parity circuits on one of the hammer driver cards HDC 1-6. Together, Chips #1-4 have twenty-two input terminals 51-1, 51-2, 51-3 and 51-4 for twenty-two predriver circuits. Output terminals from the predriver circuits are identified by numbers 55-1, 55-2, 55-3 and 55-4 for connection to the hammer driver circuits of the type shown in FIG. 10. Chip #4 has parity circuits associated with its predriver circuits for producing a chip parity O/E signal on line 56. CHIP #2 has parity circuits associated with its predriver circuits and the EXT connection on line 56 for producing a chip parity O/E signal on line 57. In the same manner, Chip #1 generates the chip parity O/E signal on line 58 to Chip 3. The parity circuits of Chip #3 combine the O/E signal on line 58 with its predriver outputs to present the card ODD/EVEN PARITY signal at terminal 59 which is connected to the parity signal line of bus 34 of FIG. 1.

Figure 9:
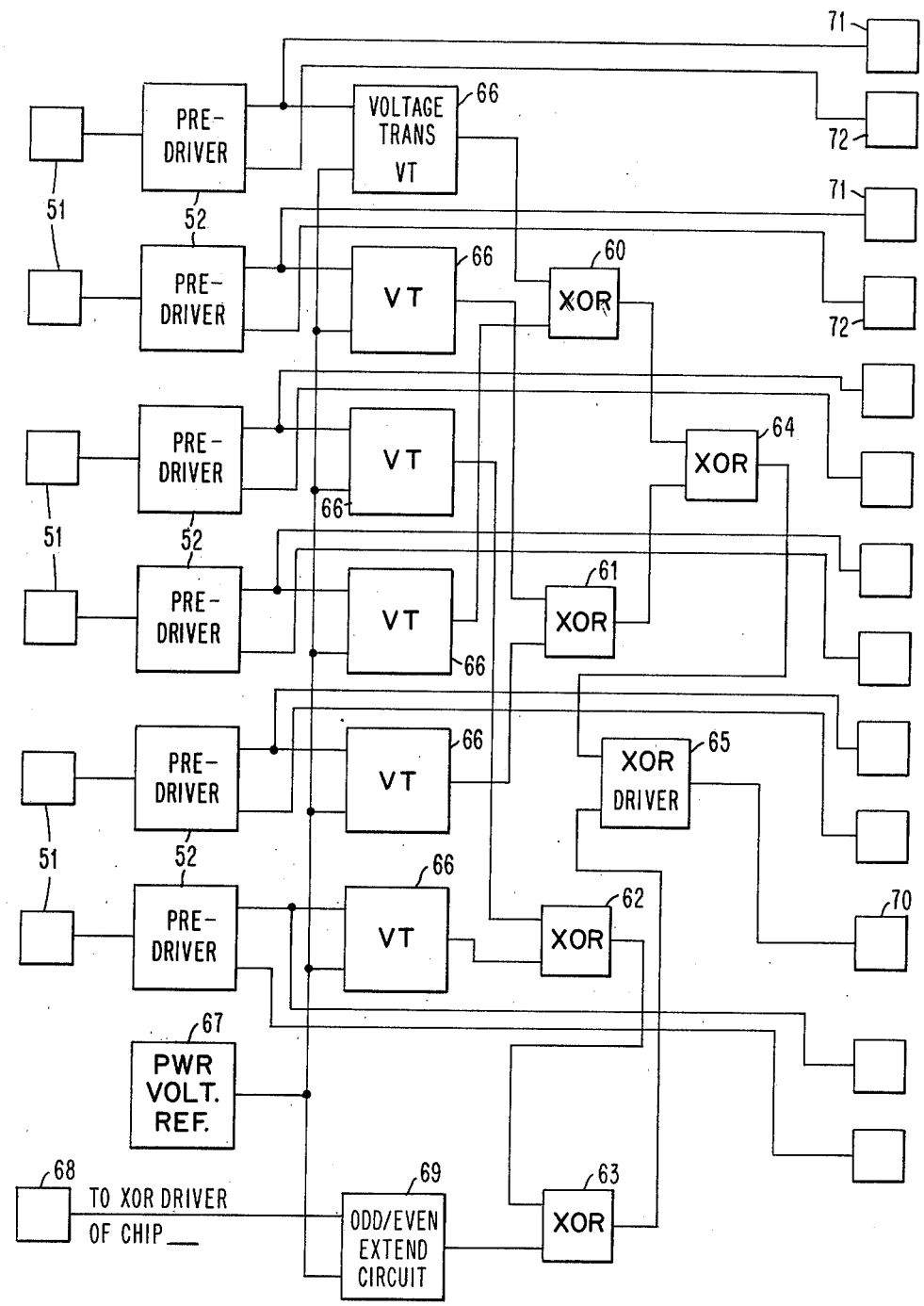
FIG. 9 is a detail circuit diagram of one of the modules of the circuit of FIG. 8.

FIG. 9 shows further details of the predriver and parity circuits for one of the modules of FIG. 8. As disclosed therein, the parity circuits comprise exclusive OR circuits XOR 60-64 and XOR driver circuit 65 arranged in a tree configuration. Voltage translators VT 66 connected to voltage reference 67 stabilize the voltage level of signals from the predrivers 52. The external O/E signal is from terminal 68 through ODD-/EVEN extend circuit 69 to XOR 63. XOR driver 65 has an output 70 for connection to terminal 68 of another Chip or to the ODD/EVEN PARITY line of bus 34. Terminal 71 and 72 provide for connection for the predrivers to hammer driver circuits as shown in FIG. 10.

Parity Checking

In preparation for printing MPU 11 precalculates an expected parity for those subscans in which print position fire data is generated for hammer operating circuits to be activated in a subscan. This is done preferably in the course of building the print position fire table PPFT in accordance with microprogramming contained in ROS 12 and operable as described in detail in the cross-referenced applications. Expected parity is computed and stored or updated and stored by MPU 11 in the last table PPFT address each time print position fire data is added to the print position fire table. For the purpose of computing expected parity a look up table is provided in ROS 12 which identifies numbers of the hammer driver cards HDC 1-6 for each print position. In the specific embodiment of the look up table, each print position is identified by one of six numbers (in the hex code 01, 02, 04, 08, 10, 20) based on the ODD/EVEN arrangement of the operating circuits on HDC 1-6. For example: print position PP 2 has a hex table number 02 (For HDC-2) while PP 47 has the hex table number 04 (for HDC-3). Thus, in computing expected parity during the building of the print position fire table in which both print position fire data is to be provided for PP 2 and PP 47, MPU 11 exclusive OR's the table number for PP 47 with the expected parity for print PP 2. The result of the exclusive OR process would be an ODD-/EVEN expected parity 06 which is stored in the last address position of the print position fire table. In this way parity checking as described hereafter relates to the hammer driver cards which are field replacable units.

Figure 11:
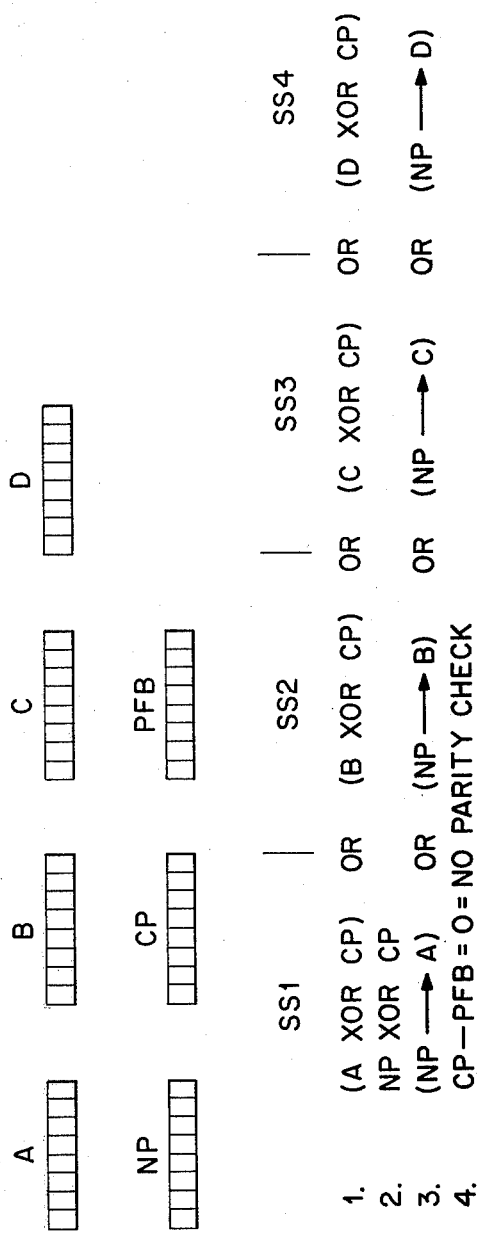
FIG. 11 shows the registers and algorithm for computing the composite parity.

As previously described, MPU 11 during the course of controlling the printing operations also performs parity checking of the hammer operating circuits and specifically the predriver circuits. This is done each subscan interval during a check parity valid window time when all operating circuits are in stable condition, i.e. no circuits are being turned ON or OFF (e.g. T0, T3, T6, T9, T12, T15 in FIG. 7). Basically, parity checking is performed by MPU 11 calculating a composite parity for each subscan and comparing it with the actual parity for a particular subscan as presented by the parity checking circuits of the hammer driver cards HDC 1-6 on bus 34 to MPXR 16. For parity checking MPU 11, or alternatively RAM 10, has a plurality of registers for storing the various parity bytes used in the computation and in the comparing operations. As seen in FIG. 11 registers A, B, C and D provide storage for the expected parity bytes from the last four subscans. NP register contains the new expected parity byte from the PPFT in RAM 10. CP is the storage register for the composite parity byte calculated by MPU 11. The PFB register is the storage for the actual parity AP received from the feedback lines of bus 34 to multiplexor MPXR 16.

FIG. 11 shows the sequence of steps in the computation of the expected parity. In subscan SS 1 time the contents of register A are exclusive OR'd with the contents of the CP register and stored in the CP register. At the beginning of printing both of the registers may have a zero byte so that the result is a zero. The expected parity byte for SS1 from the PPFT is placed in the NP register (preferably immediately following the reading of the print position data from PPFT) and exclusive OR'd with the contents of the CP register. The contents of NP register are then stored in the A register. MPU 11 then reads the actual parity byte AP from MPXR 16 by generating the multiplexor address to MPU decode 17 and through address selector 14 to MPXR 16. A CHIP SEL signal from MPU decode 17 gates the AP byte to the PFB register. In the final step MPU 11 compares the contents of the CP register and the PFB register and generates no error signal if the results of the comparison equals zero. For each succeeding subscan SS 2, SS 3, and SS 4 the process is repeated. Each time MPU 11 takes the next expected parity byte NP from the PPFT table into the NP register as described and then stores it in the B, C or D registers respectively. In each subscan the final contents of the CP register corresponds to the expected parity byte for all hammer operating circuits of the hammer driver cards HDC 1-6 which were expected to be turned on in the three preceding subscans plus the fourth subscan being processed from PPFT. This (when firing) should then correspond with the actual parity AP as represented by the ODD/EVEN PARITY from the parity circuits as described in FIGS. 8 and 9. When the fifth subscan occurs, the initial CP represents the expected parity for the preceding four subscans. The contents of A register, which is the expected parity for SS1, and CP are exclusive OR'd and the result stored in CP register. This corrects CP for hammers turning OFF. This CP is exclusive OR'd with the new NP byte for the fifth subscan and the results stored in CP register. This updates CP for hammers turning ON. NP is then stored in the A register to be used in subsequent updates. Thus, as the microprocessor unit MPU 11 performs the composite parity calculation each subscan, the new subscan parity byte from the PPFT is added and the first of the series of subscan parity bytes is dropped. In this manner, MPU 11 is constantly updating the expected parity for comparison with the actual parity, which itself continuously changes as predrivers are activated and deactivated, thereby continuously checking the state of the hammer driver circuits over the course of the entire fire tier interval. Thus each operating circuit is checked more than once during its ON and OFF time so that any conditions affecting the status or operation of the hammers occuring during that time will be reflected in one of the series of parity checks made for those operating circuits.

The operation of the printer control system including printing and parity operations may be more clearly appreciated by referring to the timing chart of FIG. 7 in combination with the following.

1. At time $T_0$. MPU 11 compares the contents of the CP and PFB registers of FIG. 11. If printing has not begun, CP and AP registers have been both preset to zero and the comparison result should be zero. Reset pulse RT 1 resets print position latches for fire tier FT 1. This is a "parity valid check" window in that no drivers are being turned 'ON' or 'OFF'.

2. $T_1$-$T_2$. MPU 11 sends print position fire data serially by byte beginning with start subscan $S_f$ address location of SST which points to print position fire table PPFT through TSD 20 to HPD 25 which decodes the print position data and sets latches in PPL 27 turning on the predriver circuits of HDC 1-6. MPU 11 reads the expected parity into the NP register from PPFT. Fire tier—FT 2 times out and goes off.

3. At $T_2$ time. Fire tier pulse—FT 1 comes on and is gated through print position latches set in step 2 to the selected predriver circuits on the HDCs. Predriver circuits turning on switch transistors 53 (see FIG. 10) to energize the related hammer coils 30. Predriver outputs are exclusive OR'd through the parity circuits placing the AP ODD/EVEN PARITY bits onto bus 34 to MPXR 16.

4. $T_2$-$T_3$. MPU 11 computes the composite parity CP for SS1 and stores in CP register.

5. $T_3$. RT 2 resets latches for fire tier—FT 2.

6. $T_3$-$T_4$. MPU 11 addresses MPXR 16 and reads AP from MPXR 16 and stores it in PFB register. MPU 11 compares contents of CP register (computed in step 4) with the contents of PFB register and generates no error signal if equal.

7. $T_4$-$T_5$. MPU 11 addresses the next address position of SST in ram 10 and sends print position fire data, from PPFT, if any, for subscan SS 2 through TSD 20 to HPD 25 which sets additional latches in PPL 27. Expected parity for SS2 from PPFT is stored in NP register. Fire tier pulse—FT 3 times out and turns off. (If SST has no IA for a subscan, MPU sends no new print position data and generates a zero NP parity byte for storage in NP register. No additional latches are set.)

8. $T_5$. Fire tier pulse—FT 2 comes on to be gated through the latches set in step 7 turning on the selected predrivers on HDC 1-6. Driver circuits are activated to energize the selected hammer coils 30 and new actual parity AP (for subscans SS 1 and SS 2) appears on bus 34 to MPXR 16.

9. $T_5$-$T_6$. MPU computes CP for SS 2 and stores the result in the CP register.

10. $T_6$. RT 3 resets latches for fire tier—FT 3.

11. $T_6$-$T_7$. MPU 11 samples AP from MPXR 16 and stores in PFB register. MPU 11 compares contents of CP register with PFB register (and generates error signal only if result not equal to zero)

12. $T_7$-$T_8$. MPU 11 retrieves print position and expected parity for SS3 from PPFT. Sends print position fire data through HPD 25 to latches of PPL 27 and puts expected parity in NP register.—FT 4 times out.

13. $T_8$.—FT 3 comes on and is gated by latches in PPL 27 set in step 12 to activate associated predriver and hammer driver circuits in the related HDC's for coils 30 of selected hammers.

14. $T_8$-$T_9$. MPU 11 computes CP for SS 3 and stores the result in the CP register.

15. $T_9$-$T_{10}$. MPU 11 samples MPXR 16 and transfers AP to PFB register. MPU 11 compares CP of step 14 with contents of PFB register to determine error condition if any. RT 4 resets latches for—FT 4.

16. $T_{10}$-$T_{11}$. MPU 11 retrieves print position and parity fire data, sets latches for SS 4, and stores expected parity in NP register. FT 5 times out.

17. $T_{11}$.—FT 4 comes on and is gated through latches of PPL 27 set in step 16 to activate predrivers and transistor of the hammer driver circuits on HDC's. New AP for SS 4 appears at MPXR 16.

18. $T_{11}$-$T_{12}$. MPU 11 computes CP for SS 4 storing the result in the CP register.

19. $T_{12}$. RT 5 resets latches set for fire tier—FT 5.

20. $T_{12}$-$T_{13}$. MPU 11 samples MPXR 16 for new AP byte and stores in PFB register. MPU 11 compares CP computed in step 18 with contents of PFB register and generates an error signal if not equal.

21. $T_{13}$-$T_{14}$. MPU 11 retrieves print position fire & expected parity for SS 5, sets latches of PPL 27, and puts expected parity in NP register.—FT 1 times out.

22. $T_{14}$.—FT 5 comes on and is gated through the latches of PPL 27 set in step 21 to predrivers of HDC's for coils 30. A new AP byte is generated by parity circuits of the HDC's and appears on bus 34 to MPXR 16.

23. $T_{14}$-$T_{15}$. MPU 11 computes CP for SS 5 and stores the result in the CP register.

24. $T_{15}$. RT 1 resets latches of fire tier—FT 1.

25. $T_{15}$-$T_{16}$. MPU 11 samples MPXR 16 and stores the new AP in PFB register. MPU 11 compares the CP computed in step 21 with the contents of PFD register to perform parity check.

The above process which is described for five subscans is repeated until all the characters in a line of data are printed. In the course of five subscans as described, which constitutes one print scan, hammer drivers will be checked five times. Thus hammer drivers are checked several times from the time of activation, during the activating interval, and following deactivation. Thus, while each hammer driver is not individually checked, the statistical probability of error being undiscovered over the interval of several subscans eliminates the need for more precise hammer checking which is considerably more complex, costly and time consuming. With the parity checking arrangement of this invention, printers can be operated at much higher speeds since the processing time associated with the checking of individual hammer operating circuits is avoided. In the event the parity check indicates error, the system operation can be interrupted for the purpose of performing diagnostics and for identifying the individual hammer operating circuits where the error occurred. Actually, in accordance with the invention the identification of the site of the error need not be more precise than identification of the hammer driver card which is a field replaceable unit FRU which can be readily removed and replaced by a non-defective unit.

While the invention has been particularly shown and described with reference to preferred embodiments thereof, it will be understood by those skilled in the art that the foregoing and other changes in form and details may be made therein without departing from the spirit and scope of the invention.

We claim:

1. In a printer system, the combination comprising a plurality of print hammers and a plurality of operating circuits operable for individually actuating said plurality of said print hammers;

a moving type belt or the like having characters alignable with said hammers in a plurality of subscan sequence arrangements; and a printer control means for selectively operating said print hammers in timed relation with the alignment of said characters with said print hammers including print hammer selection means connected to said operating circuits and operable in a plurality of successive subscans for selectively activating various combinations of said operating circuits in accordance with said sequence arrangements; and checking means for periodically checking the condition of said operating circuits including parity circuit means operatively connected with said operating circuits and operable in response to the operative condition of said operating circuits for generating an actual parity signal indicative of the actual condition of said operating circuits, said actual parity signal from said parity circuit means being continuously updated by said parity circuit means in response to changes in the operative condition of said operating circuits resulting from the operation of said print hammer selection means in the activation and deactivation of said operating circuits in the course of a plurality of subscans, said actual parity signal from said parity circuit means representing the instantaneous operative condition of said plurality of operating circuits, storage means for storing expected parity information representing print hammers to be activated for each of said plurality of subscans, processor means connected to said storage means for periodically deriving composite parity information from said expected parity information in said storage means for said plurality of subscans, said derived composite parity information representing the expected condition of said plurality of operating circuits for said plurality of subscans, and means controlled by said processor means for periodically comparing said actual parity signal from said parity circuit means with said derived composite parity information for said plurality of said subscans and for providing an error signal in the event of an inequality between said actual parity signal and said derived composite parity information.

2. In a printer, the combination in accordance with claim 1 in which
said processor means operates to update said composite parity information each succeeding subscan for comparison with said actual parity signal by first removing the expected parity information from said composite parity information of the first occurring of said plurality of subscans and adding the expected parity information for each succeeding subscan.

3. In a printer system, the combination in accordance with claim 1 in which
said plurality of operating circuits are arranged in a plurality of operating circuit groups,
said parity circuit means operatively connected with said operating circuits comprises parity circuits connected to said operating circuit groups and operable for generating a group parity signal for each group, and
said actual parity signal comprises the combination of said group parity signals for said plurality of operating circuit groups.

4. In a printer system, the combination in accordance with claim 3 in which
said group parity signal for each operating circuit group is an ODD/EVEN parity signal.

5. In a printer system, the combination in accordance with claim 3 in which
said operating circuits and said parity circuits connected thereto for each of said operating circuit groups are arranged on a circuit package which is a field replaceable unit.

6. In a printer system, the combination in accordance with claim 1 in which
said composite parity information is derived by said processor means from said expected parity information and compared by said means for comparing said composite parity information each subscan with said actual parity signal generated by said parity circuit means connected with said operating circuits.

7. In a printer system, the combination in accordance with claim 6 in which
said composite parity information and said actual parity signal are compared at a predetermined time each subscan.

8. In a printer system, the combination in accordance with claim 7 in which
said predetermined time occurs at a time when said print hammer selection means for selectively activating said operating circuits is in a stable condition.

9. In a printer system, the combination in accordance with claim 8 in which
said print hammer selection means for selectively activating said operating circuits in successive subscans includes a fire tier generator operable for applying a succession of overlapping energizing signals,
said overlapping energizing signals having an ON time interval of several subscans.

10. In a printer system, the combination in accordance with claim 1 in which
said storage means containing said expected parity information further contains print position fire data used by said print hammer selection means for selectively activating corresponding operating circuits, and
said print position fire data and said expected parity information are arranged in said storage means in subscan order.

11. In a printer system, the combination in accordance with claim 10 in which
said processor means is operable for building a print position fire table in said storage means containing said print position fire data
said processor means being further operable for generating said expected parity information for a subscan in accordance with said print position fire data for that subscan and storing said expected parity information in said storage means with said print position fire table.

12. In a printer system, the combination in accordance with claim 11 in which
said processor means is operable for generating said expected parity information for a given subscan at the time and print position fire data is placed by said processor means into said fire table in said storage means,
said expected parity information being stored in the last storage position of a given subscan of said fire table in said storage means.

13. In a printer system, the combination in accordance with claim 12 in which
said processor means is operable for updating said expected parity information for each additional print position subscan entry in said fire table of said storage means.

14. In a printer system, the combination in accordance with claim 12 in which said plurality of operating circuits for actuating said print hammers are arranged in a plurality of operating circuit groups, each of said operating circuit groups having an identifying number stored in said storage means, and said processor means is operable for deriving said expected parity information for storing in said fire table of said storage means from said operating circuit group identifying numbers in said storage means.

15. In a printer system, the combination in accordance with claim 14 in which said operating circuit group identifying numbers in said storage means are binary numbers, and said expected parity information generated by said processor means for a subscan is generated by means for exclusive ORing said group identifying numbers for each print position in said fire table with the expected parity information for any preceding print position in said fire table.

16. In a printer system, the combination in accordance with claim 14 in which said storage means of said printer control means includes said group identifying numbers arranged in a table related to the print positions for each of said plurality of operating circuits.

* * * * *